(12) United States Patent
Seroul

(10) Patent No.: US 11,934,870 B2
(45) Date of Patent: Mar. 19, 2024

(54) METHOD FOR SCHEDULING A SET OF COMPUTING TASKS IN A SUPERCOMPUTER

(71) Applicant: BULL SAS, Les Clayes-sous-bois (FR)

(72) Inventor: Pierre Seroul, Sinard (FR)

(73) Assignees: BULL SAS, Les Clayes sous Bois (FR); LE COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/943,385

(22) Filed: Sep. 13, 2022

(65) Prior Publication Data
US 2023/0085116 A1    Mar. 16, 2023

(30) Foreign Application Priority Data
Sep. 13, 2021  (EP) .................................... 21306258

(51) Int. Cl.
*G06F 9/48* (2006.01)
*G06N 20/00* (2019.01)

(52) U.S. Cl.
CPC .......... *G06F 9/4881* (2013.01); *G06N 20/00* (2019.01)

(58) Field of Classification Search
CPC .............................. G06F 9/4881; G06N 20/00
See application file for complete search history.

(56) References Cited

U.S. PATENT DOCUMENTS

| | | | | |
|---|---|---|---|---|
| 2020/0342286 A1* | 10/2020 | Zhang | ...................... | G06N 3/04 |
| 2021/0168827 A1* | 6/2021 | Shin | ...................... | G06F 9/4881 |

OTHER PUBLICATIONS

Peng, et al., "Advantage-Weighted Regression: Simple and Scalable Off-Policy Reinforcement Learning", arXiv:1910.00177v3 (Oct. 7, 2019).
Di Zhang, et all., "RLScheduler: An Automated HPC Batch Job Scheduler Using Reinforcement Learning", ARXIV.org; Cornell University Library; Oct. 20, 2019 (14 pages).
Casagrande, et al., "DeepScheduling: Grid Computing Job Scheduler Based on Deep Reinforcement Learning", arXiv:1910.08925v3 (2020).
European Search Report issued in EP21306258 dated Feb. 10, 2022 (9 pages).
Di Zhang, et all., "RLScheduler: Learn to Schedule HPC Batch Jobs Using Deep Reinforcement Learning", ARXIV.org; Cornell University Library; Oct. 20, 2019 (14 pages).
Yuping Fan, et al., "Deep Reinforcement Agent for Scheduling in HPC"; ARXIV.org; Cornell University Library; Apr. 19, 2021 (12 pages).
Chapin, et al., "Parallel Workloads Archive: Standard Workload Format"; Feb. 21, 2006 (6 pages).

* cited by examiner

*Primary Examiner* — Michael J Metzger
(74) *Attorney, Agent, or Firm* — ARC IP Law, PC; Joseph J. Mayo

(57) ABSTRACT

A method for scheduling computing tasks on a supercomputer including offline reinforcement learning (OFRL) of a scheduler on a database (LDB). The database includes at least one execution history (HIST) that includes the state (LHPCS) of a learning supercomputer at several moments (T, T−1); the actions (LACT) related to the scheduling of learning tasks on the learning supercomputer at those moments (T); and a reward (REW) related to each task. The method also includes the use of the scheduler trained on the computing tasks to be scheduled.

14 Claims, 2 Drawing Sheets

METHOD FOR SCHEDULING A SET OF COMPUTING TASKS IN A SUPERCOMPUTER

This application claims priority to European Patent Application Number 21306258.1, filed 13 Sep. 2021, the specification of which is hereby incorporated herein by reference.

BACKGROUND OF THE INVENTION

Field of the Invention

The technical field of one or more embodiments of the invention is that of scheduling computing tasks in a supercomputer.

One or more embodiments of the invention relate to a method for scheduling a set of computing tasks stored in a queue of a supercomputer. At least one embodiment of the invention also relates to a computing environment and a computer program implementing the method according to the invention.

Description of the Related Art

Figure 1:
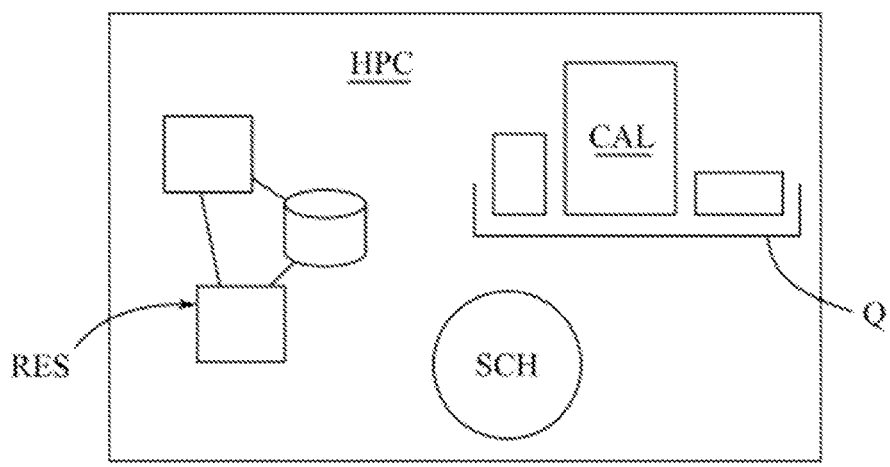

A high-performance supercomputer, also called HPC for High-Performance Computing, is a complex system that enables the processing of computing tasks in batch jobs. A supercomputer HPC, as illustrated in FIG. 1, comprises in particular computing resources RES such as compute nodes, storage nodes and at least one network allowing their interconnection. A supercomputer HPC also comprises a queue Q for storing computing tasks CAL waiting to be executed.

When a user wants to perform a computing task CAL on the supercomputer HPC, he enters the computing resource requirements for the task and the task is added to the queue Q, awaiting planning. Planning means determining the execution order and execution times of the computing tasks CAL in the queue Q.

The planning of tasks CAL in the queue Q and the allocation of computing resources RES for their execution is called scheduling and is performed by a SCH computing component called a scheduler. For example, the scheduler SCH is part of the supercomputer core. The scheduler SCH attempts to schedule the computing tasks CAL in an optimal way according to the available computing resources RES, that is, which are not already executing computing tasks, and in an order that will optimize an observable quantity, known as a "metric." The metric is, for example, the level of use of the computing resources at each moment, the waiting time of the tasks before their execution or the number of tasks executed per unit of time. The scheduler must then determine which computing task from the queue to run first and when, in order to improve the metric.

To do this, the scheduler follows a scheduling policy that dictates the planning of the tasks to be implemented according to the available computer resources, the waiting time of the tasks in the queue or the needs of each task in terms of computer resources. The scheduling policy can be established empirically, for example by an expert. The expert then takes into account the characteristics of the intended supercomputer and the typical tasks to be scheduled. On the other hand, the disadvantage of this method is that it requires the intervention of an expert whenever it is necessary to adjust the policy to a change in the characteristics of the supercomputer or a change in its use.

In order to overcome these drawbacks, solutions have been proposed to establish scheduling policies in an automated way. Among the proposed solutions, subjecting the scheduler to online reinforcement learning requires less manual intervention and makes it possible to obtain a scheduling policy with a metric at least equivalent to a scheduling policy established by an expert, capable of adapting to variations in the use of the supercomputer HPC. Online reinforcement learning consists of having the scheduler SCH interact with the supercomputer HPC and the corresponding queue Q so that the scheduler SCH autonomously learns to allocate the pending computing tasks CAL in the queue Q based on the available resources RES and the targeted metrics.

During online reinforcement learning, the scheduler SCH receives the system state, comprising the state of the supercomputer HPC comprising for example the amount of available computing resources, and the state of the queue Q comprising for example the number of pending computing tasks CAL and the computing resource requirements of each of the tasks. The scheduler SCH decides on an action, which can be to assign one or more tasks CAL from the queue Q to available resources or to execute nothing for the moment. Following this action, the scheduler receives the state of the system after the action has been performed and calculates a reward associated with the action, representative of the targeted metric. The reward can be positive when it helps improve the metric, such as reducing the number of tasks in the queue, reducing the average wait time, or increasing the amount of computing resources used, or negative when it degrades the metric, such as increasing the average wait time or underutilizing the computing resources. After several iterations, the scheduler SCH determines a scheduling policy corresponding to a list of actions making it possible to improve the metric.

However, online reinforcement learning requires a large number of iterations between the scheduler SCH and the supercomputer HPC before the scheduling policy becomes effective since online reinforcement learning is mainly performed by trial and error. Thus, the scheduler typically distributes tasks suboptimally for a long period of time before providing an optimal distribution, thus causing a drastic drop in target metrics and rendering the supercomputer unusable.

To overcome this drawback, it is known to replace the supercomputer HPC with a simulator, simulating the behavior of the supercomputer HPC. However, the latter must have high fidelity with the targeted supercomputer HPC for the established policy to be as optimal as possible, which seems impossible as it is difficult to grasp the inherent complexity of supercomputers in order to establish a convincing SIM simulator in all use cases.

Therefore, there is a need to improve the scheduling of computing tasks on a supercomputer.

BRIEF SUMMARY OF THE INVENTION

At least one embodiments of the invention offers a solution to the above-mentioned problems, by making it possible to establish a scheduling policy for computing tasks automatically and without having to implement a supercomputer simulator. Therefore, freed from the assumptions made on the simulator of a supercomputer, the scheduling of the computing tasks on the supercomputer is improved.

To this end, at least one embodiment of the invention relates to a method for scheduling a set of computing tasks stored in a queue of a supercomputer, the scheduling comprising planning the execution of each computing task of the set of computing tasks by the supercomputer and allocating at least one computing resource of the supercomputer to the execution of each computing task of the set of computing tasks, the method comprising the steps of:

offline reinforcement learning of a scheduler on a training database to obtain a trained scheduler capable of scheduling a set of computing tasks, the training database comprising at least one execution history, each execution history being associated with a training supercomputer and comprising, at each given moment of a time interval:

a state of a queue of the learning supercomputer at the given moment, said queue storing a set of learning computing tasks;

a state of the learning supercomputer at the given moment;

each action relating to the scheduling of the learning computing tasks performed at the given moment, said scheduling being implemented by a learning scheduler based on the state of the queue of the learning supercomputer and on the state of the learning supercomputer at the moment preceding the given moment;

a reward relating to each action, each reward being calculated on the basis of the state of the queue of the learning supercomputer and on the state of the learning supercomputer at the given moment and at the time preceding the given moment;

the use of the scheduler trained on the set of computing tasks stored in the supercomputer's queue.

By virtue of one or more embodiments of the invention, the scheduling of the computing tasks to be executed by a supercomputer is performed by a scheduler that has been trained by reinforcement on execution histories and therefore real data, coming from other supercomputers, so-called learning supercomputers. Since each execution history having the state of the training supercomputer associated to each moment in a time interval, there is no need to use a supercomputer simulator and the scheduling of the set of computing tasks is therefore improved.

Since the training database can have execution histories from any supercomputer, including the supercomputer on which the set of computing tasks has to be scheduled, the amount of data making it possible to perform the training can therefore be very large and thus allow for further improvements in the scheduling of computing tasks.

In addition to the features mentioned in the preceding paragraph, the method according to at least one embodiment of the invention may have one or more complementary features from the following, taken individually or according to all technically plausible combinations:

each execution history is obtained from an execution log of the corresponding learning supercomputer;

each reward is determined from the execution log;

the learning step has a sub-step of computing by the scheduler, of at least one return corresponding to a sum of a plurality of rewards;

the trained scheduler is able to schedule a set of computing tasks so as to optimize a metric and each reward is based on said metric;

each execution history comprises, at each given moment of the time interval, at least one computational feature associated with each learning computing task;

each computational feature can be selected from the following group of characteristics: a required runtime, a number of required computing resources, a task identifier, a user identifier or a user group identifier;

the number of required computing resources comprises a number of required compute nodes or a number of required storage nodes;

each execution history further comprises, at each given moment of the time interval, the time spent by each learning computing task in the corresponding queue;

each execution history comprises, at each given moment of the time interval and for each learning calculation task, information on the possibility of starting the execution of said learning computing task at said given moment;

each execution history comprises, at each given moment of the time interval and for each learning computing task, a ratio between a number of computing resources required by said learning computing task and a number of unallocated computing resources of the learning supercomputer;

each execution history further comprises, at each given moment of the time interval and for each learning computing task, a ratio between a number of computing resources required by said learning computing task and a number of unallocated computing resources of the learning supercomputer at least at a future moment later than the given moment.

the offline reinforcement learning implements advantage-weighted regression.

At least one embodiment of the invention further relates to a computing environment configured to implement the scheduling method according to the invention, the computing environment comprising:

a computing module configured to perform offline reinforcement learning of the scheduler on the basis of the learning database;

at least one storage module configured to store the training database;

the supercomputer having the queue on which the set of computing tasks to be scheduled is stored, configured to use the scheduler trained by the computing module on the set of computing tasks to be scheduled.

One or more embodiments of the invention also relate to a computer program comprising instructions that, when the program is executed by a computer, lead that computer to implement the steps of the method according to the invention.

At least one embodiment of the invention and its different applications will be better understood upon reading the following disclosure and examining the accompanying figures.

BRIEF DESCRIPTION OF THE DRAWINGS The figures are presented by way of reference and are in no way limiting to the one or more embodiments of the invention.

FIG. 1 schematically shows an example of a supercomputer according to the prior art.

Figure 2:
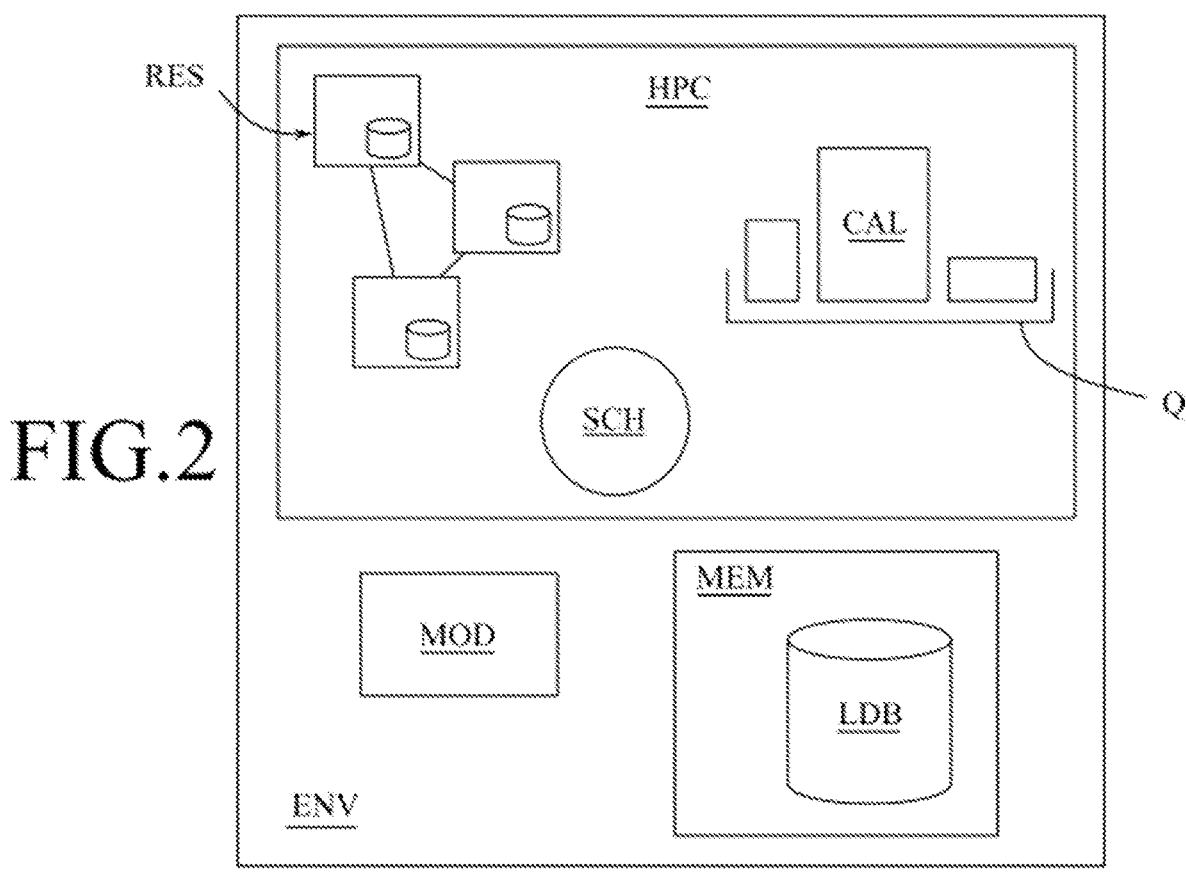

FIG. 2 schematically shows an embodiment of a computing environment according to one or more embodiments of the invention.

Figure 3:
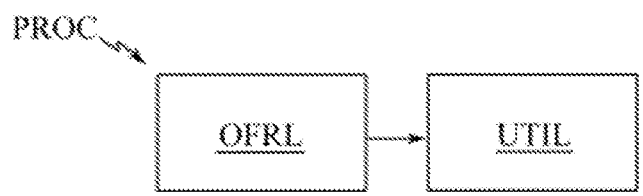

FIG. 3 schematically shows an embodiment of a method according to one or more embodiments of the invention.

Figure 4:
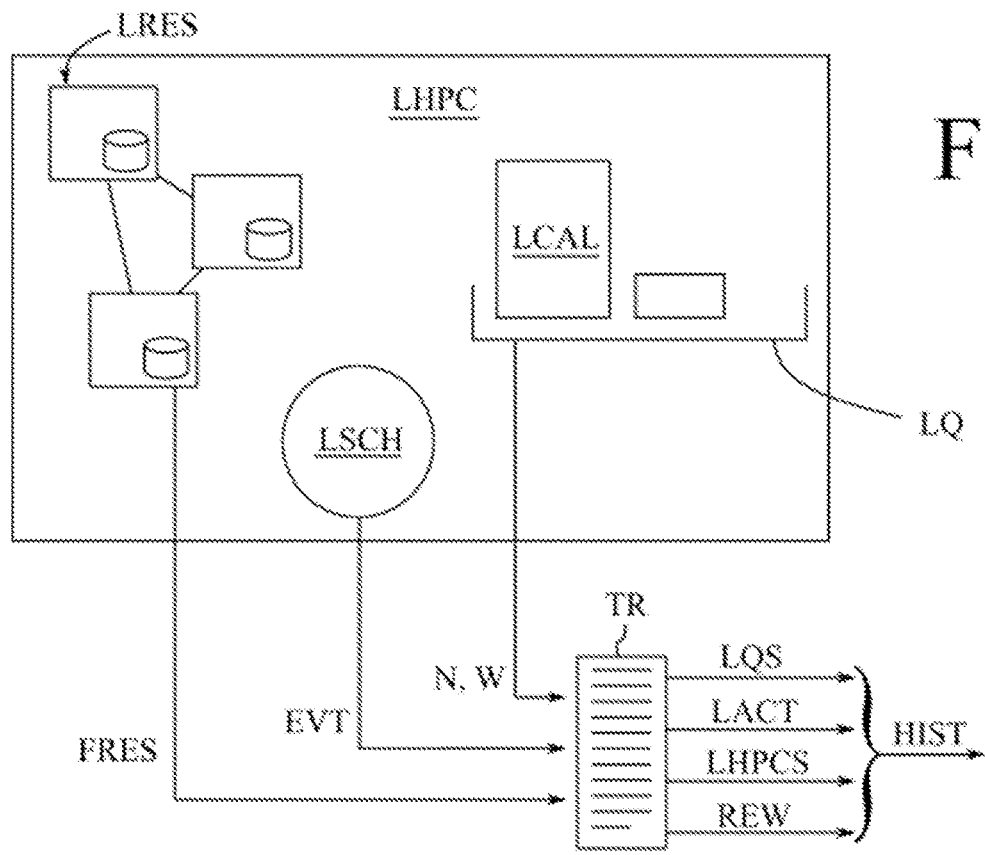

FIG. 4 schematically shows an example of a learning supercomputer according to one or more embodiments of the invention.

Figure 5:
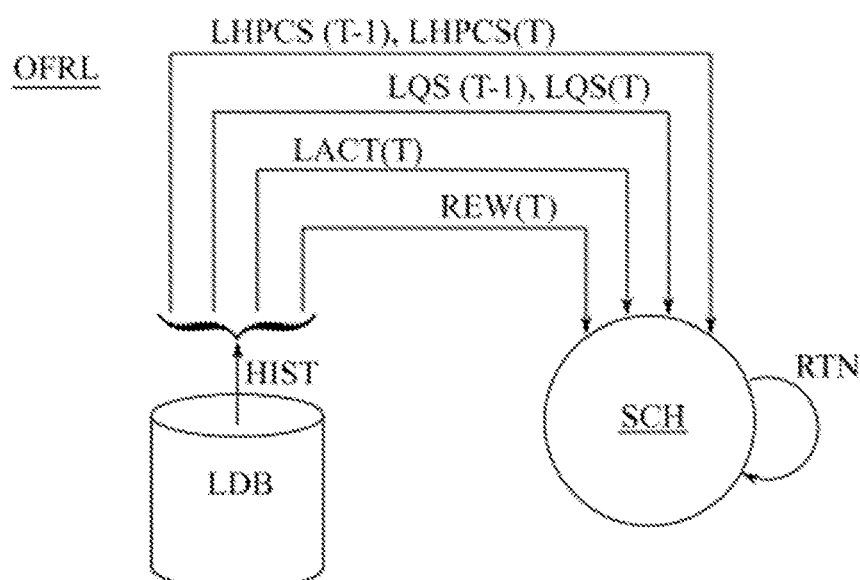

FIG. 5 schematically shows an embodiment of an offline reinforcement learning step of the method of FIG. 3, according to one or more embodiments of the invention.

Unless otherwise stated, the same element appearing in different figures has the same reference.

DETAILED DESCRIPTION OF THE INVENTION

FIG. 1 has already been described with reference to the prior art.

The object of one or more embodiments of the invention is the scheduling of computing tasks on a supercomputer, the computing tasks being intended to be executed by the supercomputer. Scheduling means:
- planning for the execution of computing tasks by said supercomputer; and
- allocating at least one computing resource of the supercomputer to the execution of each computing task.

Planning consists of defining an execution order for the computing tasks and/or a time at which the execution of each computing task starts. At least one embodiment of the invention proposes to schedule a set of computing tasks by means of a trained scheduler, which is trained automatically without resorting to the implementation of a supercomputer simulator.

At least one embodiment of the invention also relates to a computing environment ENV, for example schematically shown in FIG. 2. The computing environment ENV is configured to implement the scheduling method according to one or more embodiments of the invention. It particularly comprises:
- a computing module MOD configured to perform offline reinforcement learning of a scheduler SCH on a learning database LDB;
- at least one storage module MEM configured to store the training database LDB; and
- the supercomputer HPC.

The supercomputer HPC comprises a queue Q on which the set of computing tasks CAL to be scheduled is stored. It is also configured to use the scheduler SCH trained by the computing module MOD on the set of computing tasks CAL to be scheduled.

The supercomputer HPC comprises computing resources RES, which are also known simply as resources. A resource RES may comprise a compute node and/or a storage node and thus makes it possible, for example, to perform computing task CAL instructions and/or store computing task CAL results. A compute node can be formed by a computer processor or a set of computer processors connected to each other. A computer processor can be a central processing unit (CPU) or a graphical processing unit (GPU). A storage node may comprise fast memory, non-volatile memory, or a database. The supercomputer HPC also advantageously comprises an interconnection network allowing the different nodes to be linked together. The supercomputer HPC can have several types of architectures. The example presented in FIG. 2, according to one or more embodiments, corresponds to a supercomputer HPC with a distributed architecture called a cluster. In this example, several computers, in this case several resources RES, each comprise a compute node and a storage node and are networked by an interconnection network. They thus form the computer cluster. The supercomputer HPC can also have a centralized architecture, as illustrated in FIG. 1 according to one or more embodiments, where each node, preferably differentiated according to whether it is a compute or storage node, is connected to a part of the other nodes of the supercomputer by an interconnection network.

The supercomputer HPC's queue Q is a computing component configured to store computing tasks CAL. The queue Q belongs to the supercomputer HPC so that the computing tasks CAL it stores are executed by said supercomputer HPC. According to at least one embodiment of the supercomputer HPC, several queues may belong to the supercomputer. The example described below concerns a supercomputer HPC comprising a single queue Q, but it can be generalized to the above-mentioned examples according to one or more embodiments of the invention.

The scheduler SCH is a computer component configured to schedule computing tasks CAL on the supercomputer HPC and, more specifically, schedule computing tasks CAL stored in the queue Q so that they are executed by the supercomputer HPC. The scheduler SCH is furthermore in charge of scheduling the execution of the computing tasks CAL by the supercomputer HPC and allocating a number of resources RES of the supercomputer to the execution of said computing tasks CAL. The scheduler SCH preferably belongs to the supercomputer HPC. For example, by way of one or more embodiments, it is part of the kernel of the supercomputer HPC operating system. The scheduling method according to at least one embodiment of the invention has an offline reinforcement learning step of the scheduler SCH. Also, the scheduler SCH advantageously comprises at least one algorithm based on machine learning, for example an artificial neural network. The learning of the scheduler SCH can thus follow two learning methods. It can be a so-called critical actor method, wherein two artificial neural networks belonging to the scheduler SCH determine, from the state of a system, a probability of selection of an action among a plurality of actions and a value of the system state. It can also be a method called Q-Learning, according to which at least one artificial neural network belonging to the scheduler SCH determines, from the state of a system, a value associated with each action among a plurality of actions. Each artificial neural network is for example implemented with the "Pytorch" or "Tensorflow" library.

Each storage module MEM can be a data server or a hard disk, for example connected to the supercomputer HPC.

The computing module MOD, in at least one embodiment, can implement an advantage-weighted regression algorithm, called AWR. It can also implement other algorithms such as the Conservative Q-Learning or CQL algorithm, the BEAR resampling error accumulation reduction algorithm, or the Batch-Constrained Q-Learning or BCQ algorithm.

FIG. 3 shows a first implementation mode of the method PROC according to one or more embodiments of the invention, intended to schedule the set of computing tasks CAL stored in the queue Q of the supercomputer HPC.

The method PROC comprises a first step of offline reinforcement learning OFRL of the scheduler SCH on the LDB training database to obtain a trained scheduler SCH capable of scheduling a set of computing tasks CAL. The learning database LDB comprises at least one execution history, obtained from a learning supercomputer. Each execution history then comprises, at each given moment of a time interval:
- a state of a queue of the learning supercomputer at the given moment, said queue storing a set of learning computing tasks; and
- a state of the learning supercomputer at the given moment.

Each execution history further comprises, at each given moment, each action related to the scheduling of the learning computing tasks performed at the given moment. The scheduling of the learning computing tasks, in one or more embodiments, is implemented by a learning scheduler based on the state of the queue of the learning supercomputer and on the state of the learning supercomputer at the moment preceding the given moment.

Each execution history also comprises, at each given moment, a reward related to each action. Each reward is calculated on the basis of the state of the queue of the learning supercomputer and on the state of the learning supercomputer at the given moment and at the time preceding the given moment.

"Offline reinforcement learning" means that reinforcement learning is performed without direct interaction between the scheduler SCH and a supercomputer or between the scheduler SCH and a supercomputer simulator. In other words, in at least one embodiment, learning is performed without return from a supercomputer or simulator after an action by the scheduler SCH. In contrast, by way of one or more embodiments, in the online reinforcement learning presented in reference to the prior art, the state of a supercomputer or of a simulator is updated after each scheduler action. The offline learning OFRL of the scheduler SCH is made possible in particular by the use of the learning database LDB. The learning database LDB then replaces the scheduler/supercomputer interaction or the scheduler/simulator interaction.

FIG. 4 shows schematically, according to one or more embodiments, the data belonging to an execution history HIST as well as an example of a method allowing the constitution of this execution history HIST. Also shown schematically in FIG. 4, according to one or more embodiments, is an example of a learning supercomputer LHPC from which the execution history HIST is obtained. The learning supercomputer LHPC preferably comprises a learning queue LQ and a learning scheduler LSCH. The learning queue LQ is configured to store a set of learning computing tasks LCAL for execution by the learning supercomputer LHPC, for example, using computing resources LRES. Learning task LCAL scheduling is performed by the learning scheduler LSCH. In this sense, the learning supercomputer LHPC can be a prior art supercomputer, such as the one illustrated in FIG. 1. The learning scheduler LSCH may have undergone online reinforcement learning, as presented with reference to the prior art, in order to be able to schedule the set of learning computing tasks LCAL. At each moment, the learning scheduler LSCH can schedule LCAL learning tasks based on the LQS states, LHPCS of the learning queue LQ and on the learning supercomputer LHPC at the moment preceding the moment. It can also take into account moments prior to said previous moment. Indeed, the scheduling of learning tasks LCAL can be performed according to a scheduling policy that may be different from the policy sought for the scheduler SCH to be trained. It can be a scheduling policy according to the prior art or developed by an expert. The elements considered to determine each action of the learning scheduler LSCH are therefore not necessarily known.

The learning scheduler LSCH may be a Resource and Job Management System (RJMS). Libraries that make it possible to develop a RJMS are for example "Slurm", "OAR", "PBS", "Torque" or even "Flux".

The learning supercomputer LHPC or learning scheduler LSCH can generate an execution log TR, also called an execution trace. This is, for example, a record of the parameters FRES, N, W of the learning supercomputer LHPC constituents and/or the events EVT performed to execute the learning computing tasks LCAL. The standard workload format, abbreviated SWF, provides, for example, templates and rules to create or share execution logs.

In at least one embodiment, the generated execution log TR comprises, for example, the number N of pending LCAL training tasks in the LQ training queue. It may also comprise the times at which each training task LCAL was added to the training queue LQ or even the waiting time W of each training task LCAL in said training queue LQ. The execution log may also comprise a list of additional features associated with each learning computing task LCAL as it is added to the learning queue LQ. The execution log TR may also comprise the number FRES of unallocated learning computer resources. Advantageously, in one or more embodiments, it contains every event EVT related to the scheduling and execution of the learning computing tasks LCAL.

Each execution history HIST is then advantageously determined from an execution log TR associated with the execution of the learning tasks LCAL. A processing of the execution log TR data thus makes it possible to extract all the information allowing to constitute at least an execution history HIST and to carry out thereafter the offline learning of the scheduler SCH, by way of one or more embodiments.

Said data processing allows for example to determine the LQS, LHPCS states of the learning queue LQ and the learning supercomputer LHPC at each moment of a time interval. The status LQS of the learning queue LQ comprises, for example, the number N of learning tasks LCAL stored in the learning queue LQ and/or the time spent W in said queue LQ for each learning computing task LCAL. The status LHPCS comprises, for example, a utilization rate of the computing resources LRES of the supercomputer LHPC.

Said processing of the execution log TR data may also allow extracting each action ACT performed by the learning scheduler LSCH to schedule learning computing tasks LCAL during the time interval.

Said processing of the execution log TR data also provides a reward REW associated with each action LACT performed by the learning scheduler LSCH. The reward REW is used to determine whether the action LACT in question is positive or negative for learning task LCAL scheduling. In other words, each reward indicates the performance level of the action LACT with which it is associated. For this purpose, in at least one embodiment, said data processing can extract the states LQS, LHPCS from the learning queue LQ and the learning supercomputer LHPC at the time preceding each action ACT and at the time of each action ACT. Each reward REW is thus calculated with respect to the initial and final states related to each action LACT.

Once extracted or computed by processing the execution log TR data, according to one or more embodiments, each state LQS, LHPCS of the queue LQ and the learning supercomputer LHPC, each action LACT performed by the learning scheduler LSCH, and each reward REW related to each action LACT are then aggregated to form the execution history HIST. The execution history HIST is then stored in the learning database LDB. The extracted and aggregated data are preferentially considered at each moment of a time interval, which is prior to the time interval over which the computing tasks CAL to be scheduled will be scheduled using the method PROC according to one or more embodiments of the invention.

A high amount of training data improves the offline learning OFRL of the scheduler SCH to be trained, according to at least one embodiment. It is then advantageous that the learning database LDB comprises a plurality of execution histories HIST, by way of one or more embodiments.

Each execution history HIST can be obtained from the same learning supercomputer LHPC, for example over different time intervals, or from different learning supercomputer LHPCs. At least one execution history HIST can be obtained from the supercomputer HPC.

In addition, in one or more embodiments, there are public or private databases comprising execution logs in SWF format. This makes it easy to extract execution histories HIST from shared logs and thus build a learning database LBD without even resorting to the implementation of a learning supercomputer LHPC.

FIG. 5 schematically shows the principle of offline reinforcement learning OFRL, according to one or more embodiments of the invention. It consists in extracting from a history HIST each of the scheduling actions LACT(T) performed at a given moment T by a learning scheduler LSCH as well as each reward REW(T) associated with it. The states LQS(T−1), LQS(T), LHPCS(T−1), LHPCS(T) of a learning supercomputer LHPC and its learning queue LQ are extracted for the given moment T and also for the time preceding T−1 the given moment. Thus, said states LQS, LHPCS at the given moment T correspond to a final state, resulting from each of the actions LACT. Said states LQS, LHPCS at the moment T−1 preceding the given moment correspond to an initial state. The scheduler SCH computes at least one return RTN that corresponds to the sum of the rewards REW accumulated over a sequence of actions. Each return RTN allows the scheduler SCH to learn a sequence of actions that may comprise actions whose rewards are negative, but which, when considered in said sequence, make it possible to achieve a positive return RTN. Offline learning OFRL thus allows the scheduler SCH to be trained without tying up a supercomputer or using a supercomputer simulator.

Offline reinforcement learning OFRL provides a scheduler SCH capable of scheduling computing tasks CAL to improve a metric. Examples of metric improvements comprise maximizing the utilization of the HPC supercomputer HPC's resources RES, maximizing a computing task CAL throughput, or reducing the waiting time of computing tasks CAL in the supercomputer HPC's queue Q. Because offline reinforcement learning OFRL can comprise the calculation of at least one return RTN, it is advantageous that the determination of each reward REW is based on the metric to be improved, by way of at least one embodiment. For this purpose, in one or more embodiments, the processing of data from an execution log TR advantageously bases the determination of each reward REW on the metric to be improved.

When a user adds a computing task CAL to the supercomputer HPC's queue Q, it may be advantageous for the user to associate at least one computational feature with it. For example, in one or more embodiments, it may be a required runtime or even a number of required computing resources. Each computational feature thus allows the user to specify properties that are important for performing each computing task CAL. The number of resources required corresponds, for example, to the number of compute nodes needed to perform the calculations. It can also be a number of CPUs or GPUs belonging to compute nodes. It can also be a number of storage nodes needed to store temporary or permanent data used in the calculations. The required runtime can be the maximum runtime of the computing task CAL on the supercomputer HPC. The number of resources required and the maximum time required correspond, for example, to the amount of supercomputer HPC resources that the user rents for a given moment to perform the computing task CAL.

It is therefore advantageous, by way of one or more embodiments, that each execution history HIST of the learning database LDB comprise at least one computational feature associated with each learning computing task LCAL and preferably the same computational features as each computing task CAL. Thus, offline learning OFRL can take into account, in each execution history HIST, each computational feature of the learning tasks LCAL. In this way, the scheduling of tasks CAL will be able to take advantage of each computational feature of the computing tasks CAL.

Each computational feature can also be a task identifier, a user identifier, or a user group identifier.

Common metrics used to develop a scheduling policy comprise, for example, maximizing the utilization of the supercomputer HPC's resources RES, maximizing a computing task CAL throughput, or even reducing the waiting time of computing tasks CAL in the supercomputer HPC's queue Q. Regardless of the metric considered, they all tend to reduce the waiting time of each computing task CAL in the queue Q. For this purpose, in at least one embodiment, the time spent by each calculation task CAL in each queue Q is advantageously taken into account in the scheduling of the calculation tasks CAL. To this end, in one or more embodiments, each execution history HIST advantageously comprises the time spent by each learning computing task LCAL in each learning queue LQ. The time spent by each learning computing task LCAL can belong to the state LQS of the queue LQ associated with each learning supercomputer LHPC.

The scheduling of computing tasks CAL depends largely on the computing resources RES available to perform each task. It is therefore advantageous that each execution history HIST comprise, at each moment, information about the possibility of starting the execution of a learning computing task LCAL at said moment, according to one or more embodiments. This information is equivalent to determining whether the execution of said learning calculation task can be started immediately. In this way, in at least one embodiment, the trained scheduler SCH can use this information when scheduling computing tasks CAL.

The information may consist of a ratio of a number of computing resources RES required by said learning computing task LCAL to the number of unallocated computing resources LRES of the learning supercomputer LHPC. Thus, in at least one embodiment, when the ratio is less than or equal to 1, the execution of the learning computing task can start. On the other hand, in at least one embodiment, when the ratio is higher than 1, the available resources, that is unallocated ones, are insufficient. By unallocated resources, we mean resources intended to execute a learning computing task but not implemented in the execution of a learning computing task LCAL at the moment considered.

Thus, advantageously, each execution history HIST may comprise a ratio of a number of computing resources RES required by a learning computing task LCAL to the number of unallocated computing resources of the considered learning supercomputer LHPC, according to one or more embodiments of the invention. Preferably, in at least one embodiment, each execution history HIST comprises said report at each given moment and for each learning computing task LCAL. In this way, the trained scheduler SCH is able to determine, at a given moment, which computing tasks CAL could be started.

However, in order to improve the offline learning OFRL and thus the resulting scheduling policy, it may be advantageous to provide information during learning about the possibility of starting the execution of a learning computing task LCAL at a future time, by way of one or more embodiments of the invention. The scheduler SCH can thus learn to postpone the execution of a task CAL in order to, for example, immediately start the execution of another task CAL. To that end, in at least one embodiment, each execution history HIST may also comprise, at each given moment of the time interval, a ratio of a number of computing resources required by a learning computing task LCAL at the given moment to a number of unallocated computing resources LRES of the learning supercomputer LHPC at least one future moment after the given moment. Preferably, in at least one embodiment, each future moment considered corresponds to a few strokes of an internal clock of the scheduler SCH with respect to the given moment. For example, it is 1 to 4 strokes of the internal clock.

The method PROC, according to one or more embodiments of the invention shown FIG. 3, comprises, after the offline training step OFRL, a step of using UTIL of the scheduler SCH trained on the set of computing tasks CAL stored in the queue Q of the supercomputer HPC.

Results were obtained for a scheduling implemented by a scheduler developed by:
 a heuristic method;
 e-learning; and
 offline learning according to the invention.

The metric being compared is the average waiting time of a computing task in a supercomputer queue. The average waiting time is then equal to 100 s when the scheduling is performed by a scheduler developed using the heuristic method. The average waiting time is 138 s when the scheduler is trained by online learning, as proposed by the prior art. The average waiting time is equal to 94 s when the computing tasks CAL are scheduled by the method PROC according to the invention, that is, comprising offline reinforcement learning OFRL.

A reduced average wait time indicates that the use of the supercomputer HPC's resources RES is optimized, by way of at least one embodiment. The energy consumed by the supercomputer HPC to compute the same set of tasks CAL is therefore reduced, according to one or more embodiments of the invention.

The invention claimed is:

1. A method for scheduling a set of computing tasks stored in a queue of a supercomputer, the scheduling comprising planning an execution of each computing task of the set of computing tasks by the supercomputer and allocating at least one computing resource of the supercomputer to the execution of each computing task of the set of computing tasks, the method comprising:
 offline reinforcement learning of a scheduler on a training database to obtain a trained scheduler capable of scheduling the set of computing tasks, the training database comprising at least one execution history, each execution history of the at least one execution history being associated with a training supercomputer and comprising, at each given moment of a time interval
  a state of a queue of a learning supercomputer at the each given moment, said queue storing a set of learning computing tasks;
  a state of the learning supercomputer at the each given moment;
  each action relating to the scheduling of the set of learning computing tasks performed at the each given moment, said scheduling being implemented by a learning scheduler based on the state of the queue of the learning supercomputer and on the state of the learning supercomputer at a moment preceding the each given moment;
  a reward related to said each action, each reward of said reward related to said each action being calculated based on the state of the queue of the learning supercomputer and on the state of the learning supercomputer at the each given moment and at the moment preceding the each given moment;
 use of the scheduler trained on the set of computing tasks stored in the queue of the supercomputer.

2. The method according to claim 1, wherein each execution history of the at least one execution history is obtained from an execution log of the learning supercomputer corresponding to said each execution history.

3. The method according to claim 1, wherein the trained scheduler is able of scheduling of the set of computing tasks so as to optimize a metric and wherein said each reward is based on said metric.

4. The method according to claim 1, wherein the offline reinforcement learning of the scheduler comprises a sub-step of calculating at least one return corresponding to a sum of a plurality of rewards.

5. The method according to claim 1, wherein each execution history of the at least one execution history further comprises, at said each given moment of the time interval, at least one computational feature associated with each learning computing task of the set of learning computing tasks.

6. The method according to claim 5, wherein each computational feature of said at least one computational feature is selected from: a required runtime, a number of required computing resources, a task identifier, a user identifier or a user group identifier.

7. The method according to claim 6, wherein the number of required computing resources comprises a number of required compute nodes or a number of required storage nodes.

8. The method according to claim 1, wherein each execution history of the at least one execution history further comprises, at said each given moment of the time interval, a time spent by each learning computing task of the set of learning computing tasks in the that corresponds to said each learning computing task.

9. The method according to claim 1, wherein each execution history of the at least one execution history further comprises, at said each given moment of the time interval and for each learning computing task of the set of learning computing tasks, information on a possibility of starting an execution of said each learning computing task at said each given moment.

10. The method according to claim 1, wherein each execution history of the at least one execution history further comprises, at said each given moment of the time interval and for each learning computing task of the set of learning computing tasks, a ratio between a number of computing resources required by said each learning computing task and a number of unallocated computing resources of the learning supercomputer.

11. The method according to claim 1, wherein each execution history of the at least one execution history further comprises, at said each given moment of the time interval and for each learning computing task of the set of learning computing tasks, a ratio between a number of computing resources required by said each learning computing task and a number of unallocated computing resources of the learning supercomputer at least one future moment after the each given moment.

12. The method according to claim 1, wherein the offline reinforcement learning implements an advantage-weighted regression.

13. A computing environment configured to implement a method for scheduling a set of computing tasks stored in a queue of a supercomputer, the scheduling comprising planning an execution of each computing task of the set of computing tasks by the supercomputer and allocating at least one computing resource of the supercomputer to the execution of each computing task of the set of computing tasks, the method comprising
- offline reinforcement learning of a scheduler on a training database to obtain a trained scheduler capable of scheduling the set of computing tasks, the training database comprising at least one execution history, each execution history of the at least one execution history being associated with a training supercomputer and comprising, at each given moment of a time interval
  - a state of a queue of a learning supercomputer at the each given moment, said queue storing a set of learning computing tasks;
  - a state of the learning supercomputer at the each given moment;
  - each action relating to the scheduling of the set of learning computing tasks performed at the each given moment, said scheduling being implemented by a learning scheduler based on the state of the queue of the learning supercomputer and on the state of the learning supercomputer at a moment preceding the each given moment;
  - a reward related to said each action, each reward of said reward related to said each action being calculated based on the state of the queue of the learning supercomputer and on the state of the learning supercomputer at the each given moment and at the moment preceding the each given moment;
- use of the scheduler trained on the set of computing tasks stored in the queue of the supercomputer, the computing environment comprising:
a computing module configured to perform the offline reinforcement learning of the scheduler on the training database;
at least one storage module configured to store the training database; and
the supercomputer having the queue on which the set of computing tasks to be scheduled is stored, configured to use the scheduler trained by the computing module on the set of computing tasks to be scheduled.

14. A non-transitory computer program comprising instructions that, when the non-transitory computer program is executed by a computer, lead the computer to implement a method for scheduling a set of computing tasks stored in a queue of a supercomputer, the scheduling comprising planning an execution of each computing task of the set of computing tasks by the supercomputer and allocating at least one computing resource of the supercomputer to the execution of each computing task of the set of computing tasks, the method comprising:
- offline reinforcement learning of a scheduler on a training database to obtain a trained scheduler capable of scheduling the set of computing tasks, the training database comprising at least one execution history, each execution history of the at least one execution history being associated with a training supercomputer and comprising, at each given moment of a time interval
  - a state of a queue of a learning supercomputer at the each given moment, said queue storing a set of learning computing tasks;
  - a state of the learning supercomputer at the each given moment;
  - each action relating to the scheduling of the set of learning computing tasks performed at the each given moment, said scheduling being implemented by a learning scheduler based on the state of the queue of the learning supercomputer and on the state of the learning supercomputer at a moment preceding the each given moment;
  - a reward related to said each action, each reward of said reward related to said each action being calculated based on the state of the queue of the learning supercomputer and on the state of the learning supercomputer at the each given moment and at the moment preceding the each given moment;
- use of the scheduler trained on the set of computing tasks stored in the queue of the supercomputer.

* * * * *